United States Patent
McCray

(10) Patent No.: US 6,659,284 B2
(45) Date of Patent: Dec. 9, 2003

(54) MCMINER MATERIAL TRANSFER PROCESS

(76) Inventor: H. Glenn McCray, 9051 Shasta Rd., Phelan, CA (US) 92371

(*) Notice: Subject to any disclaimer, the term of this patent is extended or adjusted under 35 U.S.C. 154(b) by 101 days.

(21) Appl. No.: 10/086,278

(22) Filed: Mar. 4, 2002

(65) Prior Publication Data

US 2003/0173290 A1 Sep. 18, 2003

(51) Int. Cl.$^7$ .................................................. B07B 4/00
(52) U.S. Cl. ....................... 209/147; 209/906; 222/413; 406/53; 406/168; 406/169
(58) Field of Search ........................... 406/53, 168, 169; 222/413; 209/147, 906

(56) References Cited

U.S. PATENT DOCUMENTS

| | | | | |
|---|---|---|---|---|
| 304,982 A | * | 9/1884 | Wiesebrock | 406/114 |
| 3,860,513 A | * | 1/1975 | Hart et al. | 209/1 |
| 3,956,106 A | * | 5/1976 | Muck et al. | 209/11 |
| 4,264,243 A | * | 4/1981 | Bentzen-Bilkvist | 406/169 |
| 4,344,723 A | * | 8/1982 | Ellingson | 406/53 |
| 4,410,106 A | * | 10/1983 | Kierbow et al. | 222/135 |
| 4,668,130 A | * | 5/1987 | Sharp | 406/14 |
| 4,753,353 A | * | 6/1988 | Kramer | 209/570 |
| 4,763,792 A | * | 8/1988 | Kind | 209/570 |
| 4,881,855 A | * | 11/1989 | Rempel et al. | 406/53 |
| 5,152,604 A | * | 10/1992 | Paul | 366/101 |
| 5,273,162 A | * | 12/1993 | Riherd | 209/13 |
| 5,503,198 A | * | 4/1996 | Becker | 141/67 |
| 5,575,596 A | * | 11/1996 | Bauer et al. | |
| 5,727,909 A | * | 3/1998 | Laird | 406/106 |
| 5,765,728 A | * | 6/1998 | Simpson et al. | 222/146.2 |
| 6,368,028 B1 | * | 4/2002 | Nester | 406/109 |

* cited by examiner

Primary Examiner—Joseph A. Dillon

(57) ABSTRACT

A process, a means of transferring mineable material from any number of sources to a number of devices capable of separating out values from that mineable material. See (FIG. 1) the mineable material enters the hose (1), the hose (1) being under vacuum, and is transferred in a flow of air to the upper portion of a hopper (2). The hopper (2) is also under vacuum. The flow of air leaves the upper portion of the hopper (2) through hose (4), which is connected, to a vacuum blower (5). The mineable material, being heavier than air is deposited in the hopper (2). The mineable material is removed from the bottom of the hopper (2) by means of a variable speed drive screw conveyor (3) and is transferred to a separation device (8). The level of heavy mineable material (6) contained in the hopper (2), along with the mineable material contained in the screw conveyor (3) causes a seal against the force of vacuum and allows the mineable material to enter and be removed from hopper (2) simultaneously if desired. In order to seal the process against the force of vacuum at process start up a flap check (7) is provided at the exit end of the screw conveyor (3).

1 Claim, 1 Drawing Sheet

MCMINER MATERIAL TRANSFER PROCESS

BACKGROUND OF THE INVENTION

1. Field of the Invention

This invention is a new process for transferring, under pneumatic vacuum, mineable material to a device capable of separating out values from mineable material.

2. Description of Prior Art

Historically, recovering precious heavy metals and other values from mineable material has been very limited. Processes range from dry panning and rocker screening to placing a shovel full of value bearing mineable material on a blanket and then two men on opposite ends of the blanket toss the material into the air again and again until the wind blows away the lighter material hopefully leaving some value, usually gold, on the blanket. In more modern times we have a number of different types and sizes of dry washers. One example is the popular Model 151 from Keene Engineering, U.S. Pat. No. 4,615,797. This model is usually fed by shovel and bucket. This process is labor intensive and very inefficient.

A few larger dry washers are available, some fed by backhoe type equipment, some fed by a number of people with shovels, but none have shown any real commercial value. From time to time some miners have attempted to haul valve bearing material to a site with water for processing or hauling water or piping and pumping water to the digging site. These operations usually fail.

Until now there has never been an efficient and cost effective way to transfer dry value bearing mineable materials to device for separating out the values.

There is no real prior art to compare this new process to in the mining industry.

This invention has numerous uses and advantages. The parts and components utilized in this process can be stationary or portable, very large or small, and arranged in many different ways. The processing units developed from this invention can be very cost effective, relatively inexpensive to purchase and operate, and profitable to mining operations in previously unprofitable areas. There are many more uses and advantages, too numerous to mention.

LIST OF REFERENCE NUMERALS

Figure 1:
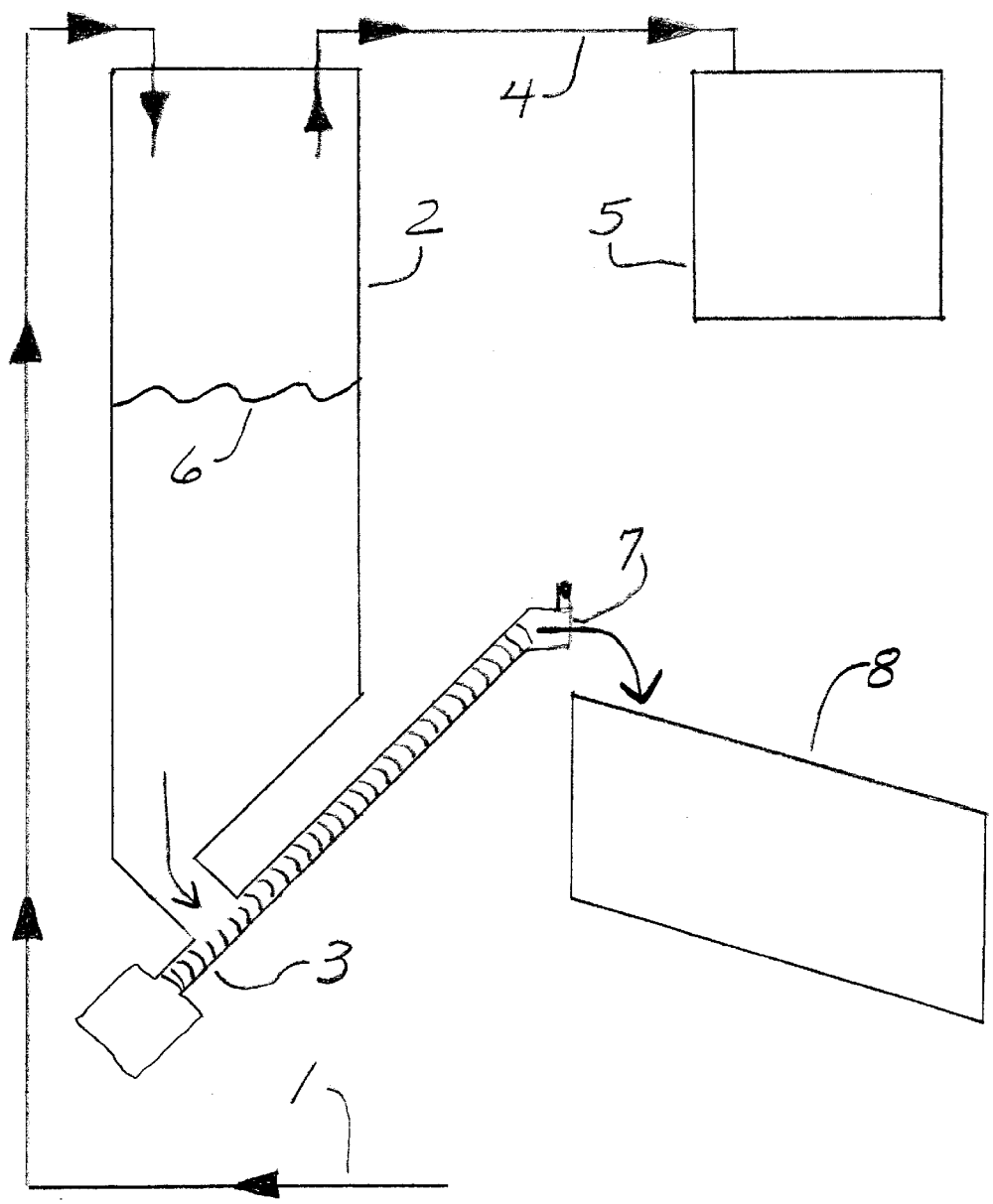
FIG. 1 is a flow diagram illustrating the flows and their interaction with preferred parts and components of the process invented.

1. Piping and/or hose
2. Hopper
3. VSD Screw Conveyor
4. Piping and/or hose
5. Vacuum blower
6. Material level
7. Flap Check
8. Separation device

SUMMARY

This invention is a process for transferring mineable materials. It transfers by means of a flow of air under vacuum. It deposits this material in a hopper, which is also under vacuum. Then it transfers that material from that hopper to a values (heavy precious metals and/or gems etc.) separating device, such as a dry washer.

DESCRIPTION AND OPERATION OF INVENTION SEE FIG. 1

1. Piping and/or Hose—This is a means of transferring mineable material in a flow of air under vacuum from any number of sources. It should be sized and typed appropriately. Its flow is toward and is connected to the Hopper 2 in the Hopper's 2 upper portion.

2. Hopper—This is a means of containment to receive and store the mineable material. This hopper is under vacuum supplied by 5 through 4. Its material inlet is at its connection to 1. Its material outlet is at its connection to 3. Its airflow, under vacuum, outlet is at its connection to 4. It should be sized and shaped appropriately.

3. Variable Speed Drive Screw Conveyor—This is a means of transferring mineable material from Hopper 2 to a separation device 8. During operation this screw conveyor and the lower portion of the hopper 2 will be more or less, full of mineable material thereby creating a vacuum seal. This screw conveyor should be sized appropriately and of strength such that it transfers the material from the hopper 2 considering the force of vacuum in hopper 2.

4. Piping and or Hose—This is a means of transferring pneumatic vacuum from hopper 2 to vacuum blower 5. It should be sized and typed appropriately.

5. Vacuum Blower—This is a means of causing a flow of air under vacuum, through 1,2, and 4.

6. Material Level—The level of material in the hopper 2 is very important if the operator of the process desires that the mineable material enters the hopper 2 from hose 1 at the same time that the screw conveyor 3 is removing the mineable material from the hopper 2. In this simultaneous operation the material level must have a minimum and maximum height in hopper 2. The mineable material being heavy separates from the airflow and fills the hopper 2 to the desired material level range. The screw conveyor is also full of mineable material. It is this mineable material, contained in the screw conveyor 3 and contained in the hopper 2 at the material level range that causes a seal against the vacuum force and allows the simultaneous operation.

This process can also be operated in a fill and dump mode. This would consist of filling the hopper 2 to a desired level, shutting off the vacuum blower 5 and then energizing the screw conveyor 3.

The level of material can be monitored and controlled numerous ways to maintain the seal. Included in the ways can be monitoring the level through view ports in the hopper 2 wall and operating the screw conveyor 3 controls manually or the entire process can be fully automated.

7. Flap Check—This can be a rubber flap over the end of the screw conveyor tube 3 to serve as the seal at process start up and if the level of material should become to low in hopper 2.

8. Separation device—A number of devices capable of separating out values from mineable materials are commercially available.

CONCLUSION, RAMIFICATION, AND SCOPE OF INVENTION

Undoubtedly, the reader will see that the process invented will provide a new, efficient and cost effective means of transferring mineable material from any number of sources to a number of devices capable of separating out values from that mineable material. This process can be utilized in numerous sizes, shapes, configurations, and modes of transportation when it is utilized and constructed into a processing unit. Units can be portable, stationary or built on skids and can be a very useful part of other processes used in the mining industry.

For example, weekend miner can utilize this process to transfer values bearing mineable material from a favorite dry placer deposit on his desert mining claim. On a much larger scale the hose or pipe 1, shown in FIG. 1 can be laid up the side of a mountain to a hard rock mine. The ore from the mine can be crushed at a landing at the mine entrance. This process can be a good but cheap means of transferring that crushed ore down the mountain to a values separating device.

I believe this new process invention has the potential to revolutionize a substantial portion of the mining industry worldwide. I also believe it can create many new jobs in the mining equipment manufacturing and sales industry as well as in the mining industry itself Even though the parts and components that can be used in processing units utilizing this new process invention have been commercially available for many years, their use, related to this invention is new.

Accordingly, the scope of the invention should not be construed as limited to the embodiment depicted and described herein, but by the appended claims and their legal equivalents.

I claim:

1. A process for applying pneumatic vacuum conveyance in separating out values from mined material, comprising the steps of:

transferring mined material under pneumatic vacuum to a container;

controlling the volumetric flow rate of said mined material during transfer;

transferring said mined material from said container to a separation device while maintaining said container under pneumatic vacuum;

separating said values from said mined material.

* * * * *